(12) United States Patent
Sigl

(10) Patent No.: US 10,638,554 B2
(45) Date of Patent: Apr. 28, 2020

(54) SYSTEMS AND METHODS FOR INTERCHANGEABLE INDUCTION HEATING SYSTEMS

(71) Applicant: ILLINOIS TOOL WORKS INC., Glenview, IL (US)

(72) Inventor: Dennis Roland Sigl, Greenville, SC (US)

(73) Assignee: Illinois Tool Works Inc., Glenview, IL (US)

( * ) Notice: Subject to any disclaimer, the term of this patent is extended or adjusted under 35 U.S.C. 154(b) by 615 days.

(21) Appl. No.: 14/921,782

(22) Filed: Oct. 23, 2015

(65) Prior Publication Data
US 2016/0183330 A1 Jun. 23, 2016

Related U.S. Application Data

(60) Provisional application No. 62/096,271, filed on Dec. 23, 2014.

(51) Int. Cl.
*H05B 6/36* (2006.01)
*H05B 6/42* (2006.01)
(Continued)

(52) U.S. Cl.
CPC ............. *H05B 6/365* (2013.01); *H05B 6/101* (2013.01); *H05B 6/36* (2013.01); *H05B 6/40* (2013.01); *H05B 6/42* (2013.01)

(58) Field of Classification Search
CPC ... H05B 6/02; H05B 6/36; H05B 6/40; H05B 6/42; H05B 6/101; H05B 6/365;
(Continued)

(56) References Cited

U.S. PATENT DOCUMENTS

| 2,416,047 A | 2/1947 | Dolan |
| 2,829,229 A | 4/1958 | Metz |

(Continued)

FOREIGN PATENT DOCUMENTS

| CN | 1917970 | 2/2007 |
| CN | 101213318 | 7/2008 |

(Continued)

OTHER PUBLICATIONS

International Search Report from PCT application No. PCT/US2015/061406, dated Apr. 28, 2016, 15 pgs.

*Primary Examiner* — Brian W Jennison
(74) *Attorney, Agent, or Firm* — McAndrews, Held & Malloy, Ltd.

(57) ABSTRACT

An induction heating system includes interchangeable secondary induction heating assemblies and/or secondary induction heating coil flux concentrators that are specifically configured for the particular type of weld being created and/or the particular weld joint where the weld is created. For example, the secondary induction heating assemblies and/or secondary induction heating coil flux concentrators may have specific physical configurations (e.g., shapes, contours, etc.) and/or include specific materials (e.g., ferrites) that are well suited for the particular type of weld being created and/or the particular weld joint where the weld is created. In certain embodiments, a robotic positioning system may be configured to move the secondary induction heating coil to an induction heating coil changing station to, for example, detach the secondary induction heating coil, and attach another secondary induction heating coil, thereby facilitating different secondary induction heating coils to be used for induction heating of different types of welds, for example. In addition, in certain embodiments, the robotic positioning system may be configured to move the secondary induction heating coil to the induction heating coil (Continued)

changing station to, for example, detach the secondary induction heating coil flux concentrator, and attach another secondary induction heating coil flux concentrator.

23 Claims, 13 Drawing Sheets

(51) Int. Cl.
*H05B 6/10* (2006.01)
*H05B 6/40* (2006.01)

(58) Field of Classification Search
CPC ...... H05B 9/1006; H05B 9/32; B23K 9/1006; B23K 9/32
USPC .......................................................... 219/672
See application file for complete search history.

(56) References Cited

U.S. PATENT DOCUMENTS

| | | | |
|---|---|---|---|
| 3,288,982 | A | 11/1966 | Haruyoshi |
| 3,612,806 | A | 10/1971 | Lewis |
| 3,619,548 | A | 11/1971 | Cavagnero |
| 4,632,366 | A | 12/1986 | Sprung |
| 4,673,784 | A | 6/1987 | Vickers |
| 5,101,086 | A * | 3/1992 | Dion ............ H05B 6/145 219/619 |
| 5,319,179 | A | 6/1994 | Joecks |
| 5,343,023 | A | 8/1994 | Geissler |
| 5,461,215 | A | 10/1995 | Haldeman |
| 5,708,253 | A | 1/1998 | Bloch |
| 6,043,471 | A | 3/2000 | Wiseman |
| 6,162,509 | A * | 12/2000 | Cherico ............ C23C 4/02 427/427 |
| 6,198,083 | B1 * | 3/2001 | Pierman ............ C21D 9/525 148/568 |
| 6,265,701 | B1 * | 7/2001 | Bickel ............ B23K 9/00 219/136 |
| 6,333,484 | B1 | 12/2001 | Foster |
| 6,528,771 | B1 * | 3/2003 | Matsen ............ H05B 6/06 219/634 |
| 6,861,617 | B2 | 3/2005 | Dull |
| 7,015,439 | B1 | 3/2006 | Thomas |
| 7,156,277 | B2 | 1/2007 | Ishikawa |
| 7,696,458 | B2 | 4/2010 | Thomas |
| 7,786,415 | B2 | 8/2010 | Thomas |
| 7,922,812 | B2 | 4/2011 | Ciulik |
| 8,115,147 | B2 * | 2/2012 | Thomas ............ H05B 6/101 219/660 |
| 2002/0060218 | A1 * | 5/2002 | Ulrich ............ H05B 6/06 219/665 |
| 2003/0038130 | A1 * | 2/2003 | Thomas ............ H05B 6/14 219/632 |
| 2004/0084442 | A1 * | 5/2004 | La Rovere ............ E21B 33/14 219/643 |
| 2006/0289492 | A1 | 12/2006 | Thomas |
| 2009/0188910 | A1 | 7/2009 | McDonnell |
| 2011/0210110 | A1 | 9/2011 | Dearman |
| 2011/0284527 | A1 * | 11/2011 | Holverson ............ B23K 9/1006 219/660 |

FOREIGN PATENT DOCUMENTS

| | | |
|---|---|---|
| CN | 101491856 | 7/2009 |
| DE | 2544790 | 4/1977 |
| DE | 10047492 A1 | 4/2002 |
| DE | 20319657 | 4/2005 |
| DE | 102005057476 | 8/2007 |
| DE | 102012007959 | 8/2015 |
| EP | 0525621 | 2/1993 |
| EP | 1420419 | 5/2004 |
| EP | 2210695 | 7/2010 |
| EP | 2620512 | 7/2013 |
| FR | 2823459 | 10/2002 |
| GB | 761760 | 11/1956 |
| GB | 1530308 | 2/1969 |
| GB | 2192294 | 1/1988 |
| GB | 2463694 A | 3/2010 |
| JP | 06015447 | 1/1994 |
| JP | 2001242015 | 9/2001 |
| RU | 2077415 | 4/1997 |
| RU | 2098247 | 12/1997 |
| RU | 2125310 | 1/1999 |
| WO | 2010002269 | 1/2010 |
| WO | 2014199251 | 12/2014 |

\* cited by examiner

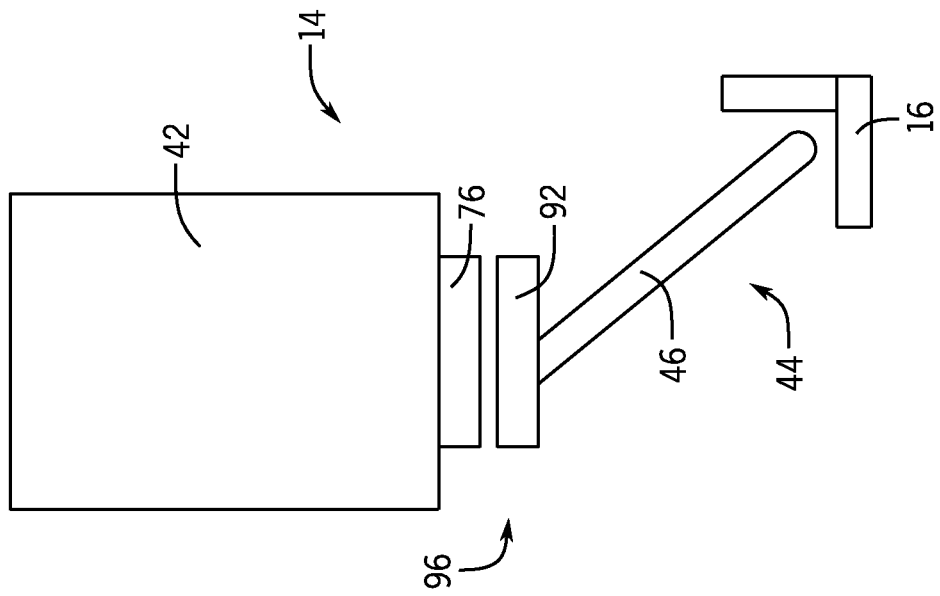
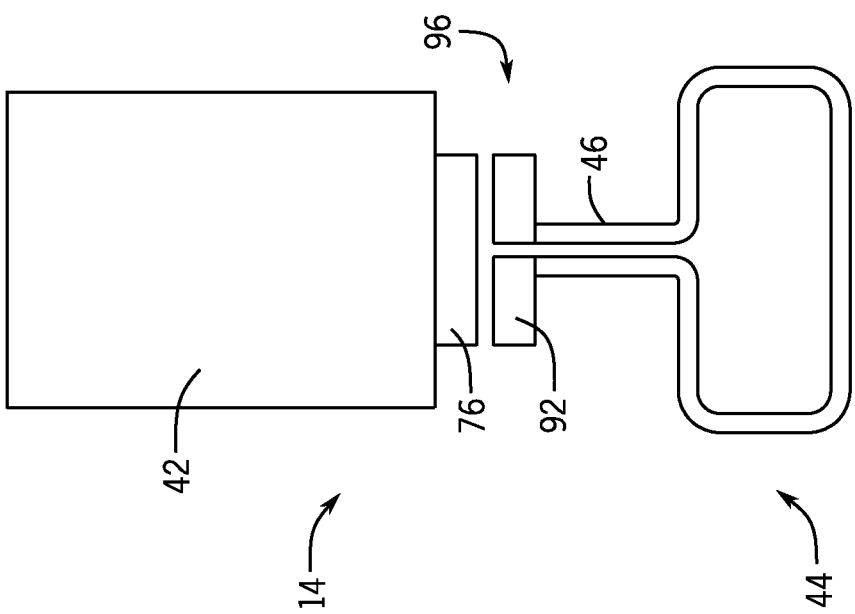

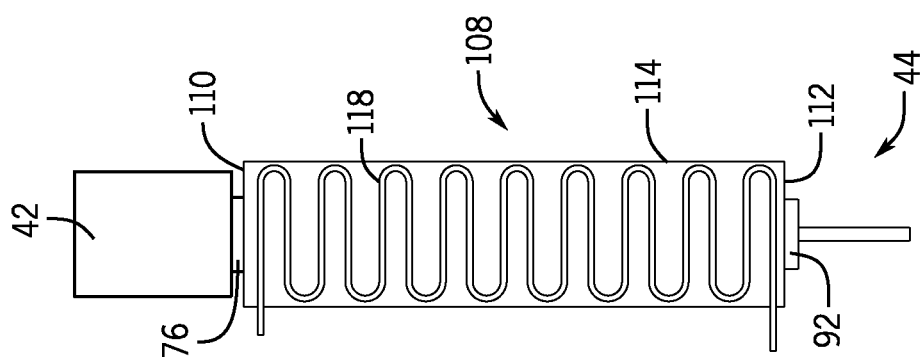
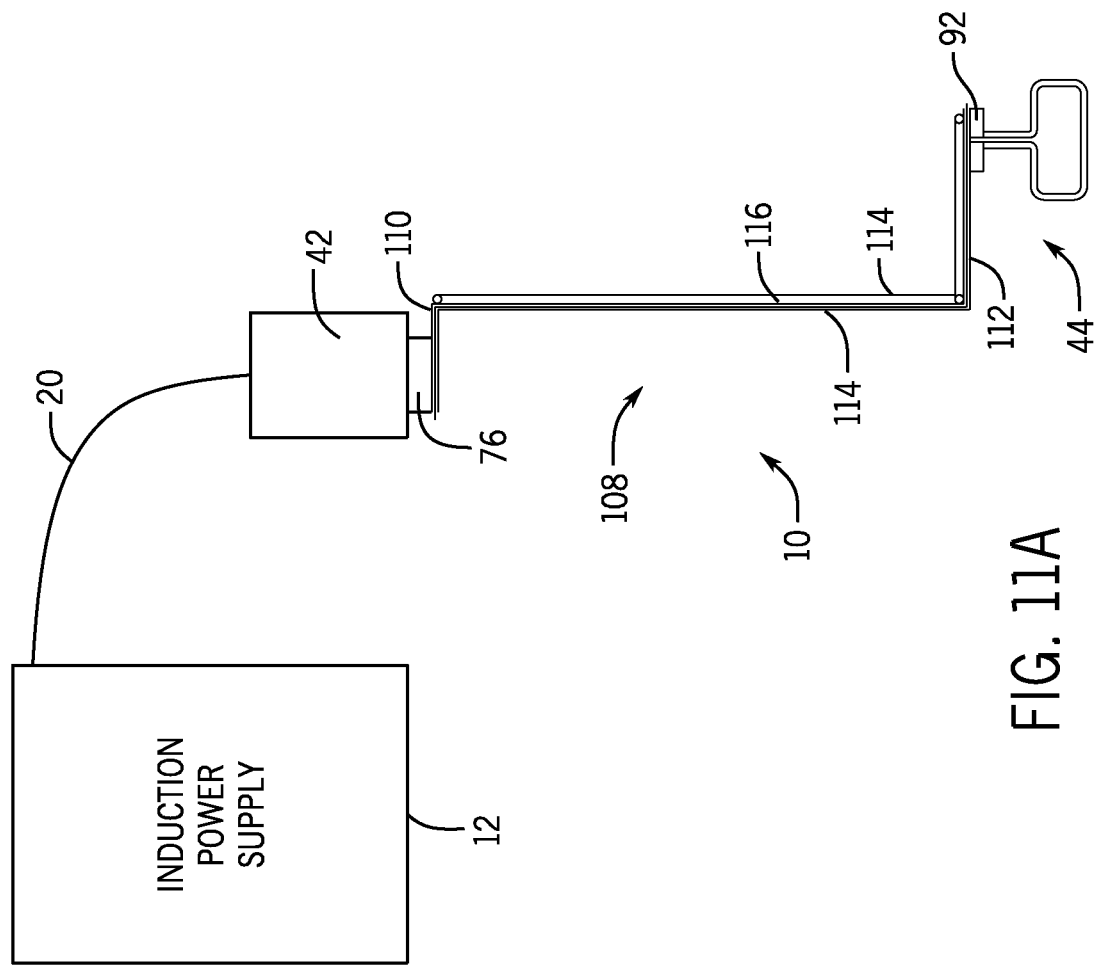
FIG. 11B
FIG. 11A

SYSTEMS AND METHODS FOR INTERCHANGEABLE INDUCTION HEATING SYSTEMS

CROSS REFERENCE TO RELATED APPLICATION

This application claims priority from and the benefit of U.S. Provisional Patent Application Ser. No. 62/096,271, entitled "SYSTEMS AND METHODS FOR INTERCHANGEABLE INDUCTION HEATING SYSTEMS," filed Dec. 23, 2014, which is hereby incorporated by reference in its entirety for all purposes.

BACKGROUND

The present disclosure relates generally to induction heating systems and, more particularly, to interchangeable induction heating assemblies.

Induction heating may be used to pre-heat metal before welding or post-heat the metal after welding. It is well known to weld pieces of steel (or other material) together. For example, pipes are often formed by taking a flat piece of steel and rolling the steel. A longitudinal weld is then made along the ends of the rolled steel, thus forming a section of pipe. A pipeline may be formed by circumferential welding adjacent sections of pipe together. Other applications of welding steel (or other material) include ship building, railroad yards, tanker trucks, or other higher strength alloy welding.

When welding steel (or other material), it is generally desirable to pre-heat the workpiece along the weld path. Pre-heating is used to raise the temperature of the workpiece along the weld path because the filler metal binds to the workpiece better when the weld path is pre-heated, particularly when high-alloy steel is being welded. Without pre-heating, there is a greater likelihood that the filler metal will not properly bind with the workpiece, and a crack may form, for example. Generally, the steel may be preheated to approximately 600° C. prior to welding.

BRIEF DESCRIPTION

Embodiments described herein include interchangeable secondary induction heating assemblies and/or secondary induction heating coil flux concentrators that are specifically configured for the particular type of weld being created and/or the particular weld joint where the weld is created. For example, the secondary induction heating assemblies and/or secondary induction heating coil flux concentrators may have specific physical configurations (e.g., shapes, contours, etc.) and/or include specific materials (e.g., ferrites or other highly permeable materials) that are well suited for the particular type of weld being created and/or the particular weld joint where the weld is created. In certain embodiments, a robotic positioning system may be configured to move the secondary induction heating coil to an induction heating coil changing station to, for example, detach the secondary induction heating coil, and attach another secondary induction heating coil, thereby facilitating different secondary induction heating coils to be used for induction heating of different types of welds, for example. In addition, in certain embodiments, the robotic positioning system may be configured to move the secondary induction heating coil to the induction heating coil changing station to, for example, detach the secondary induction heating coil flux concentrator, and attach another secondary induction heating coil flux concentrator.

DRAWINGS

These and other features, aspects, and advantages of the present disclosure will become better understood when the following detailed description is read with reference to the accompanying drawings in which like characters represent like parts throughout the drawings, wherein:

FIGS. 8A and 8B are side views of embodiments of the induction heating assembly, illustrating the quick disconnect features for groove welds and fillet welds, respectively, in accordance with the present disclosure;

FIG. 11A is a side view of an embodiment of the inducting heating system including a secondary connector in accordance with the present disclosure;

FIG. 11B is front view of the secondary connector of FIG. 11B;

DETAILED DESCRIPTION

Figure 1:
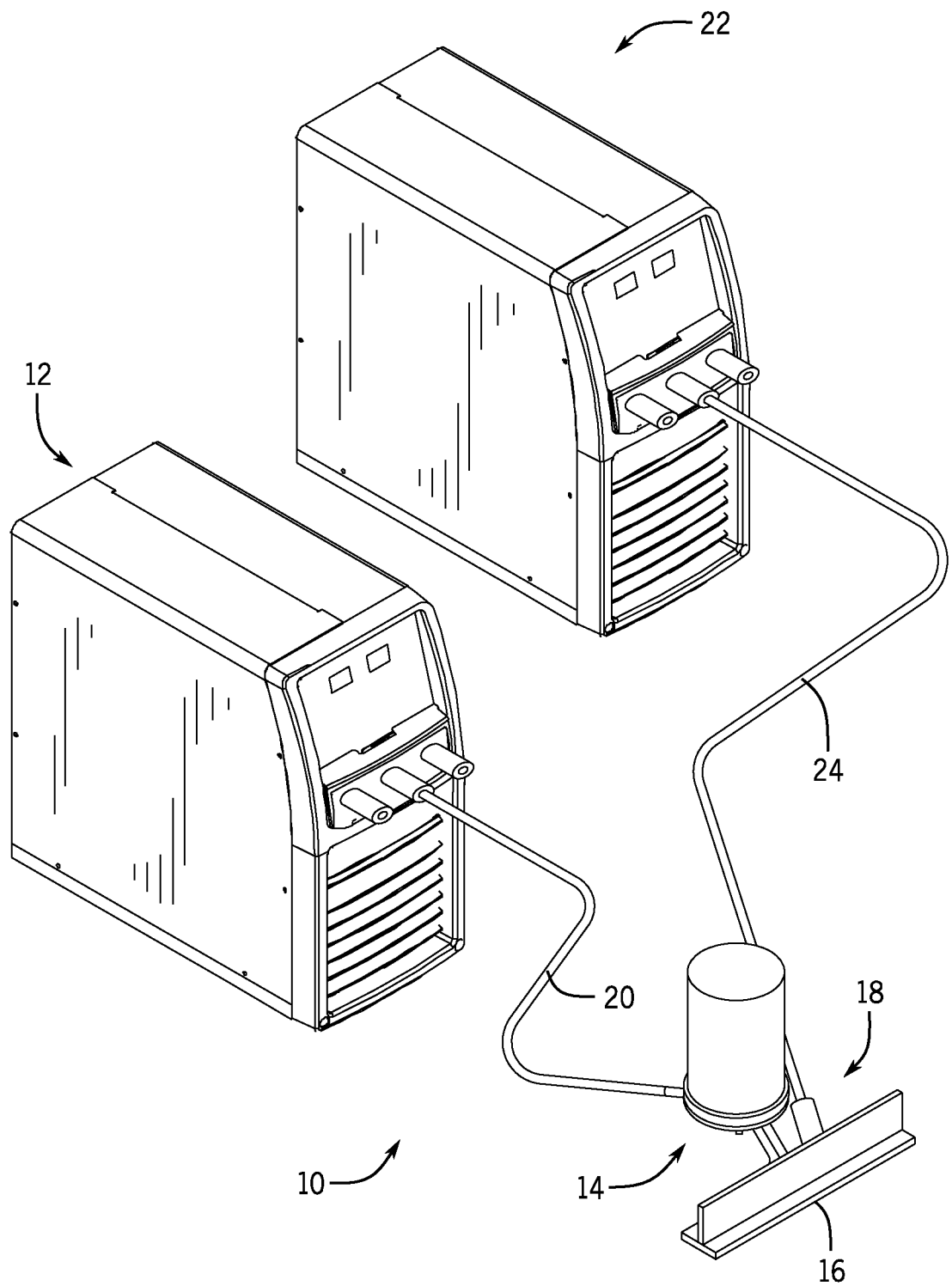
FIG. 1 is a perspective view of an embodiment of an induction heating system in accordance with the present disclosure.

FIG. 1 is a perspective view of an embodiment of an induction heating system 10 in accordance with the present disclosure. As illustrated in FIG. 1, the induction heating system 10 includes an induction power supply 12 and an induction heating assembly 14 that function together to pre-heat and/or post-heat a workpiece 16 (e.g., a fillet weld workpiece in the illustrated embodiment). For example, in certain embodiments, the induction heating assembly 14 may be moved by a robotic positioning system relative to the workpiece 16 along a weld path either in front of or behind a welding torch 18 that may also be moved by a robotic positioning system such that the induction heating assembly 14 may pre-heat or post-heat the weld produced on the workpiece 16 by the welding torch 18. The induction heating assembly 14 receives induction heating power, coolant, and so forth, from the induction power supply 12 via a first cable 20 (or cable bundle), and the welding torch 18 receives welding power, welding wire, a gas supply, and so forth, from a welding power supply 22 via a second cable 24 (or cable bundle).

In certain embodiments, the induction power supply 12 provides alternating current (AC) power to the induction heating assembly 14 via the cable 20. The AC power provided to the induction heating assembly 14 produces an AC magnetic field that induce eddy currents into the workpiece 16, thereby causing the workpiece 16 to be heated. The induction power supply 12 may be any power supply capable of outputting sufficient power to the induction heating assembly 14 to produce the induction heating of the workpiece 16. For example, in certain embodiments, the induction power supply 12 may be capable of outputting power up to 300 amperes, however, other embodiments may be capable of generating greater output current (e.g., up to 700 amperes, or even greater). In certain embodiments, the induction power supply 12 includes converter circuitry as described herein, which provides the AC output that is applied to the induction heating assembly 14.

Figure 2:
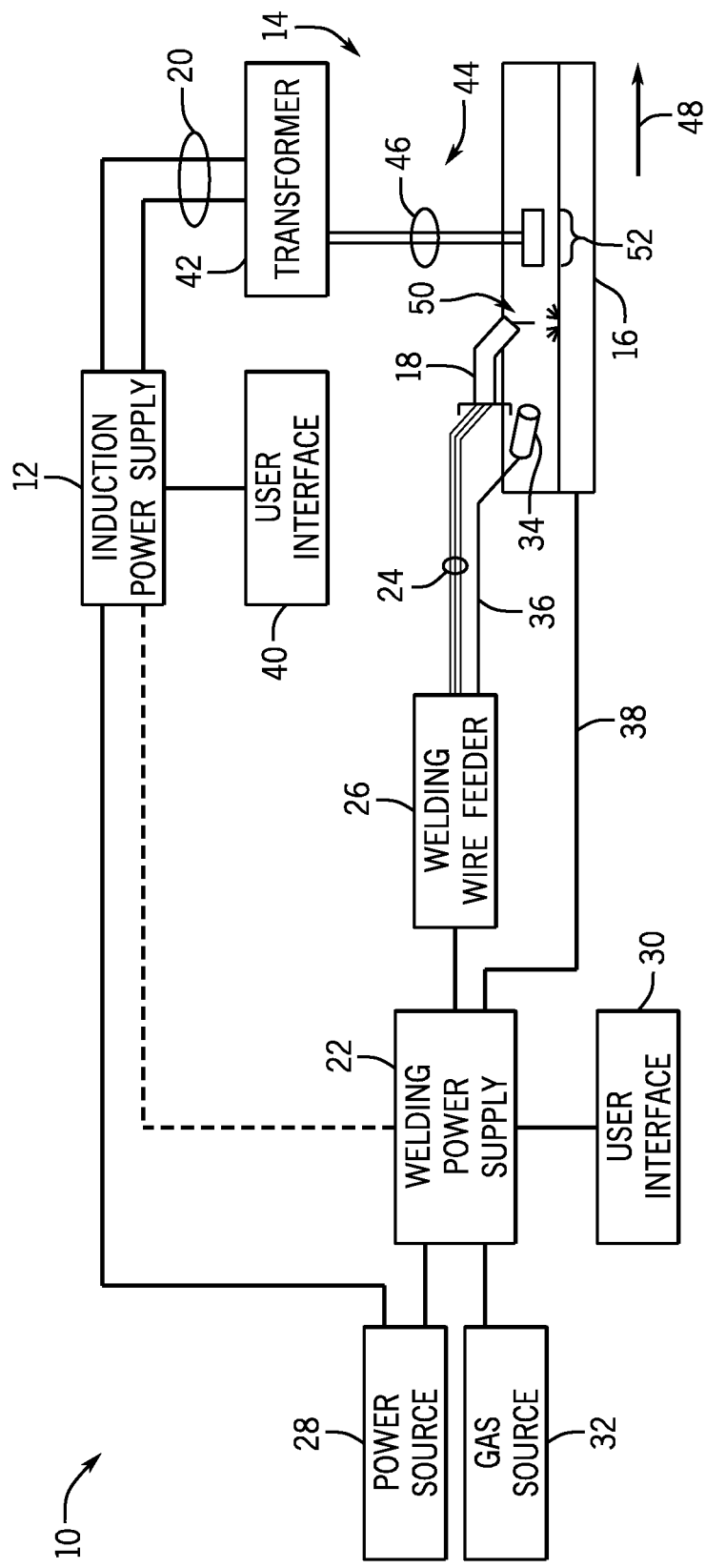
FIG. 2 is a block diagram of an embodiment of an induction heating system in accordance with the present disclosure.

FIG. 2 is a block diagram of an embodiment of an induction heating system 10 in accordance with the present disclosure. The system 10 includes the welding power supply 22, a welding wire feeder 26, and the welding torch 18. The welding power supply 22 may be a power converter or an inverter based welding power supply requiring a power source 28. Many different circuit designs may be provided in the power source, and many different welding regimes may be envisaged (e.g., direct current, alternating current, pulsed, short circuit, etc.) Any of these conventional circuits and process technologies may be used in conjunction with the present induction heating techniques. In other embodiments, the welding power supply 22 may be a generator or alternator welding power supply which may include an internal combustion engine.

The welding power supply 22 may also include a user interface 30 for adjusting various welding parameters such as voltage and current, and for connecting a power source 28, if required. Additionally, a gas source 32 may be coupled to the welding power supply 22. The gas source 32 is the source of the shielding gas that is supplied to the welding torch 18. The gas source 32 also supplies shielding gas to an auxiliary shielding gas diffuser 34. For example, in certain embodiments, the gas source 32 may supply argon gas. As will be appreciated, the shielding gas is applied to the location of the liquid weld pool by the welding torch 18 and the auxiliary gas diffuser 34 to prevent absorption of atmospheric gases which may cause metallurgical damage to the weld. As shown, the welding power supply 22 is coupled to the welding wire feeder 26. For example, the welding power supply 22 may be coupled to the welding wire feeder 26 by a feeder power lead, a weld cable, a gas hose, and a control cable.

The welding wire feeder 26 shown in the illustrated embodiment provides welding wire to the welding torch 18 for use in the welding operation. A variety of welding wires may be used. For example, the welding wire may be solid carbon steel, solid aluminum, solid stainless steel, composite and flux cored wire, and so forth. The present embodiments may be used with any suitable type of electrode, and any suitable wire composition. Furthermore, the thickness of the welding wire may vary depending on the welding application for which the welding wire is used. For example, the welding wire may be 0.045, 0.052, 1/16, 3/32, 1/8, or any other diameter. Furthermore, the welding wire feeder 26 may enclose a variety of internal components such as a wire feed drive system, an electric motor assembly, an electric motor, and so forth. The welding wire feeder 26 may further include a control panel (not shown) that allows a user to set one or more wire feed parameters, such as wire feed speed. In the illustrated embodiment, the auxiliary shielding gas diffuser 34 is also coupled to the welding wire feeder 26 by a gas hose 36. However, the welding wire feeder 26 may be used with any wire feeding process including gas operations (gas metal arc welding (GMAW)) or gasless operations (shielded metal arc welding (SMAW) or self-shielding flux cored arc welding (FCAW)).

As shown, the welding wire is fed to the welding torch 18 through the cable 24. The cable 24 may also supply gas to the welding torch 18. As further shown, a separate cable 38 couples the welding power supply 22 to the workpiece 16 (typically via a clamp) to complete the circuit between the welding power supply 22 and the welding torch 18 during a welding operation.

The exemplary system 10 also includes the induction power supply 12 and the induction heating assembly 14. As illustrated, the induction power supply 12 includes a user interface 40. The user interface 40 may include buttons, knobs, dials, and so forth to allow an operator to regulate various operating parameters of the induction power supply 12. For example, the user interface 40 may be configured to enable an operator to set and adjust the frequency of the alternating current produced by the induction power supply 12. Similarly, the user interface 40 may enable an operator to select a desired output temperature of a secondary induction heating coil 44 of the induction heating assembly 14. The user interface 40 may also include one or more displays configured to provide system feedback to the operator (e.g., real-time temperature of the secondary induction heating coil 44, travel speed of the secondary induction heating coil 44 relative to the workpiece 16, and so forth). The induction power supply 12 is coupled to a transformer 42 via the cable bundle 20. In certain embodiments, the transformer 42 may be an air-cooled or a liquid-cooled system. For example, a first conduit may enable flow of a coolant into the transformer 42, and another conduit may enable flow of the coolant from the transformer to a heat exchanger or other device that removes heat from the coolant.

In certain embodiments, the alternating electrical current exits the transformer 42 and is supplied to the secondary induction heating coil 44 by electrical conductors 46. As discussed in detail below, the electrical conductors 46 may have a hollow core and may also route the flowing coolant through the secondary induction heating coil 44. In the illustrated embodiment, the secondary induction heating coil 44 is disposed proximate to the workpiece 16. As the alternating current flows through the secondary induction heating coil 44, eddy currents are generated and induced within the workpiece 16. The eddy currents flow against the electrical resistivity of the workpiece 16, thereby generating localized heat in the workpiece 16. As shown, the secondary induction heating coil 44 is positioned ahead of the welding torch 18. In other words, for a welding torch 18 operating and traveling in a direction 48, the secondary induction heating coil 44 is placed in front of the welding torch 18 (i.e., along the weld joint and before a welding arc 50 created by the welding torch 18). As a result, the secondary induction heating coil 44 heats a localized area 52 of the workpiece 16 immediately ahead of the welding arc 50, thereby raising the temperature of the localized area 52 just ahead of the welding arc 50.

As shown, the welding power supply 22 and the induction power supply 12 may also be coupled. For example, the welding power supply 22 and the induction power supply 12 may be coupled by a hard wire, through a wireless connection, over a network, and so forth. As discussed in detail below, the welding power supply 22 and the induction power supply 12 may exchange data and information during the operation of the exemplary system 10. More particularly, the welding power supply 22 and the induction power supply 12 may function in cooperation (e.g., utilize feedback from one another) to adjust various operating parameters of the exemplary system 10.

It should be noted that modifications to the exemplary system 10 of FIG. 1 may be made in accordance with aspects of the present disclosure. Although the illustrated embodiments are described in the context of an arc welding process, the features of the present disclosure may be utilized with a variety of other suitable welding or cutting systems and processes. For example, the induction heating assembly 14 may be used with a plasma cutting system or with a plate bending system. More specifically, the induction heating assembly 14 may be disposed ahead of a plasma cutter to increase the temperature of a localized area ahead of the plasma cut, thereby enabling increased cutting speeds. Furthermore, while the induction heating assembly 14 is positioned ahead of the welding torch 18 in the present embodiment, the induction heating assembly 14 may be positioned in other locations. For example, the induction heating assembly 14 may be positioned behind the welding torch 18 to provide a heat treatment to a weld location after the workpiece 16 is welded and fused. Similarly, certain embodiments may include more than one induction heating assembly 14 (i.e., a first induction heating assembly 14 positioned ahead of the welding torch 18 to raise the temperature of the localized area 52 prior to welding, and a second heating assembly 14 positioned behind the welding torch 18 to provide a heat treatment of a weld location that has been fused).

Figure 3:
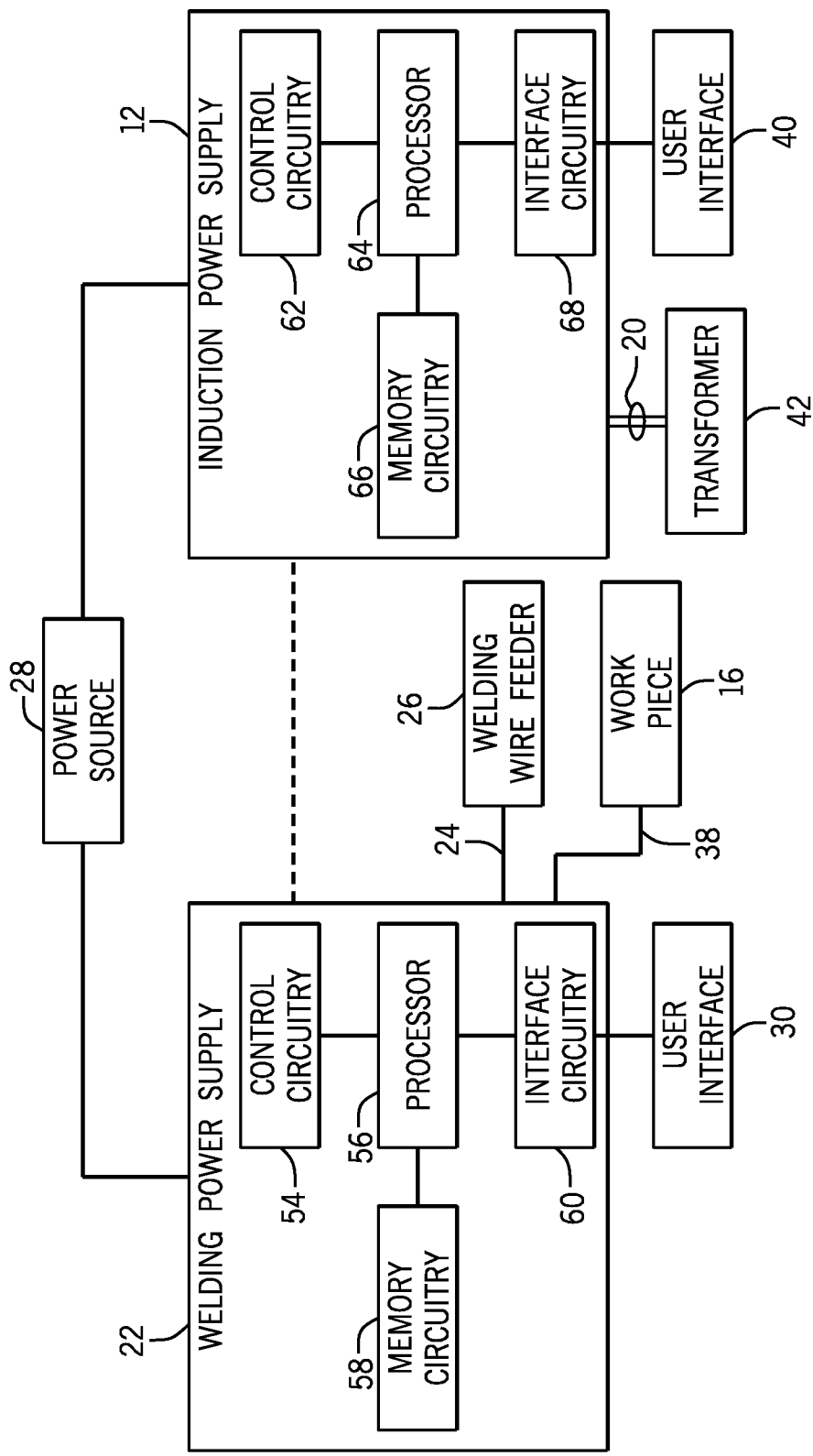
FIG. 3 is a block diagram illustrating certain of the internal components of an embodiment of an induction heating system in accordance with the present disclosure.

FIG. 3 is a block diagram illustrating certain of the internal components of the exemplary induction heating system 10 in accordance with the present disclosure. As discussed above, the power source 28 may power the welding power supply 22 and/or the induction power supply 12. The welding power supply 22 provides power to the welding wire feeder 26, and the welding power supply 22 is coupled to the workpiece 16, thereby completing the circuit between the welding power supply 22 and the welding torch 18 during a welding operation. The induction power supply 12 generates an alternating electrical current that is supplied to the transformer 42, which subsequently routes the current to the secondary induction heating coil 44. As mentioned above, the welding power supply 22 and the induction power supply 12 may be coupled and configured to exchange information and data (e.g., operating parameters, settings, user input, etc.) to enable the welding power supply 22 and the induction power supply 12 to function cooperatively.

The welding power supply 22 includes several internal components to regulate various operating parameters of the system 10. In the illustrated embodiment, the welding power supply 22 includes control circuitry 54, a processor 56, memory circuitry 58, and interface circuitry 60. The control circuitry 54 is configured to apply control signals to the welding power supply 22 and/or the welding wire feeder 26. For example, the control circuitry 54 may provide control signals to the welding wire feeder 26 relating to the voltage or current provided by the welding power supply 22. The control circuitry 54 may also provide control signals for regulating the operation of the welding wire feeder 26 such as pulse width modulated (PWM) signals to regulate a duty cycle for a motor assembly in the welding wire feeder 26, and so forth.

The control circuitry 54 is further coupled to the processor 56, memory circuitry 58 and interface circuitry 60. The interface circuitry 60 is coupled to the user interface 30 of the welding power supply 22. As discussed above, the user interface 30 is configured to enable an operator to input and control various settings of the welding power supply 22. For example, the user interface 30 may include a menu for selecting a desired voltage or current output to the welding wire feeder 26. Additionally, the user interface 30 may include a menu or list of welding processes or welding wire materials and diameters. As will be appreciated, different welding processes, welding wire materials, and welding wire diameters may have different characteristics and may require differing configurations for various operating parameters. For example, configuration parameters requiring differing values may include voltage output, current output, wire feed speed, wire feed torque, and so forth. Preset values for such configuration parameters, as well as others, may be stored in the memory circuitry 58 for each of a variety of welding processes, welding wire materials, and welding wire diameters.

By way of example, a user may select a welding process from a menu of a plurality of different welding processes displayed on the user interface 30 of the welding power supply 22. The user interface 30 communicates the selection of the welding process to the interface circuitry 60, which communicates the selection to the processor 56. The processor 56 then retrieves the particular configuration parameters for the welding process stored in the memory circuitry 58. Thereafter, the processor 56 sends the configuration parameters to the control circuitry 54 in order that the control circuitry 54 may apply appropriate control signals to the welding wire feeder 26. In certain embodiments, as discussed below, the control circuitry 54 of the welding power supply 22 may also communicate the configuration parameters to the induction power supply 12.

In the illustrated embodiment, the induction power supply 12 includes control circuitry 62, a processor 64, memory circuitry 66, and interface circuitry 68. The control circuitry 62 is configured to apply control signals to the induction power supply 12 and/or the transformer 42. For example, the control circuitry 62 may provide control signals relating to the alternating electrical current (e.g., alternating current frequency) supplied by the induction power supply 12 to the transformer 42. Additionally, the control circuitry 62 may regulate the operation of a cooling system used with the induction power supply 12 and/or the transformer 42. As mentioned above, the induction heating assembly 14 may use air or a coolant to provide circulating cooling throughout the induction heating assembly 14. For example, the control circuitry 62 may regulate a flow of a liquid coolant through the transformer 42 and the secondary induction heating coil 44 to maintain a desired temperature of the induction heating assembly 14.

The control circuitry 62 is further coupled to the processor 64, memory circuitry 66, and interface circuitry 68. The interface circuitry 68 is coupled to the user interface 40 of the induction power supply 12. As mentioned above, the user interface 40 of the induction power supply 12 enables an operator to regulate one or more operating parameters or settings of the induction power supply system 12. For example, the user interface 40 may enable a user to select a particular design of the induction heating assembly 14 from a menu of designs. As will be appreciated, different secondary induction heating coil 44 designs may have different configuration parameters. For example, different designs may have different maximum operating temperatures, and may require different frequencies of alternating current to achieve a desired temperature. Similarly, the coolant used to cool the induction heating assembly 14 may have different configuration parameters (e.g., heat transfer coefficients, viscosities, flow rates, and so forth). Preset values for such configuration parameters, as well as others, may be stored in the memory circuitry 66. For example, the user interface 40 may communicate a user selection of the secondary induction heating coil 44 designs to the interface circuitry 68, which may communicate the selection to the processor 64. The processor 64 may then retrieve the particular configuration parameters for the secondary induction heating coil 44 stored in the memory circuitry 66. Thereafter, the processor 64 sends the configuration parameters to the control circuitry 62 in order that the control circuitry 62 may apply appropriate control signals to the induction power supply 12 and the transformer 42.

As mentioned above, the welding power supply 22 and the induction power supply 12 may be coupled to one another by a hard wire, wireless connection, network connection, or the like. In particular, the welding power supply 22 and the induction power supply 12 may be configured to send and receive data and information to one another relating to the operating of the system 10. For example, the welding power supply 22 and the induction power supply 12 may communicate with one another to coordinate the speed of the induction heating assembly 14 and the welding torch 18 with respect to the workpiece 16. As will be appreciated, in certain embodiments, the secondary induction heating coil 44 and the welding torch 18 are both designed for automated operation. As a result, the welding power supply 22 and the induction power supply 12 may be coupled and configured to communicate and maintain a constant distance between the secondary induction heating coil 44 and the welding arc 50, as the secondary induction heating coil 44 and the welding torch 18 travel along the workpiece 16 in the direction 48. For example, the welding torch 18 and the secondary induction heating coil 44 may each have sensors configured to measure a travel speed or temperature along the workpiece 16.

For further example, the welding power supply 22 may communicate a user selected welding process (i.e., a welding process selected by an operator through the user interface 30) to the induction power supply 12. More specifically, the control circuitry 54 of the welding power supply 22 may communicate the welding process selection to the control circuitry 62 of the induction power supply 12. Thereafter, the control circuitry 62 of the induction power supply 12 may modify any of a variety of operating parameters based on the user selected welding process. For example, the control circuitry 62 may begin or end the process, or regulate the frequency or amplitude of the alternating current provided to the secondary induction heating coil 44 or the flow rate of a coolant through the transformer 42 and/or the secondary induction heating coil 44 to achieve a desired maximum temperature of the secondary induction heating coil 44 based on the welding process selected. More specifically, for a selected welding process, the processor 64 may retrieve configuration parameters for the selected welding process from the memory circuitry 66 and send the configuration parameters to the control circuitry 62. Similarly, the control circuitry 62 of the induction power supply 12 may send operating information or data to the control circuitry 54 of the welding power supply 22. For example, the control circuitry 62 may send temperature data (e.g., maximum temperature or real-time temperature) of the secondary induction heating coil 44 to the control circuitry 54 of the welding power supply 22. Thereafter, the control circuitry 54 of the welding power supply 22 may adjust one or more operating parameters of the welding power supply and/or welding wire feeder 26 in response to the data received from the induction power supply 12. For example, the control circuitry 54 of the welding power supply 22 may begin or end the welding process or adjust the wire feed speed or torque of the welding wire feeder 26 based on the temperature data of the secondary induction heating coil 44 received from the control circuitry 62 of the induction power supply 12. As will be appreciated, for higher temperatures provided by the secondary induction heating coil 44 to the localized area 52 of the workpiece 16 ahead of the welding arc 50, a slower wire feed speed may needed.

It should be noted that in certain embodiments, the power supplies 12, 22 and associated control circuits used for generation and control of induction heating power and welding power may be joined. That is, some or all of the circuits may be provided in a single power supply, and certain of the circuits may serve both functions (e.g., operator interface components). Additionally, a central controller may provide coordination and synchronization commands to both the welding/cutting system and the induction system.

It should also be noted that while reference is sometimes made in the present disclosure to advancement or movement of the welding torch and adjacent induction heating system, depending upon the welding system design, the welding torch 18 and induction heating assembly 14 may indeed be displaced, while in other systems these may remain generally stationary, with the workpiece or workpieces being moved. Such may be the case, for example, in certain robotic or automated operations, in submerged arc applications, and so forth. Both scenarios are intended to be covered by the present disclosure, and references to moving a torch and induction heating system should be understood to include any relative motion between these components and the workpiece or workpieces.

Figure 4:
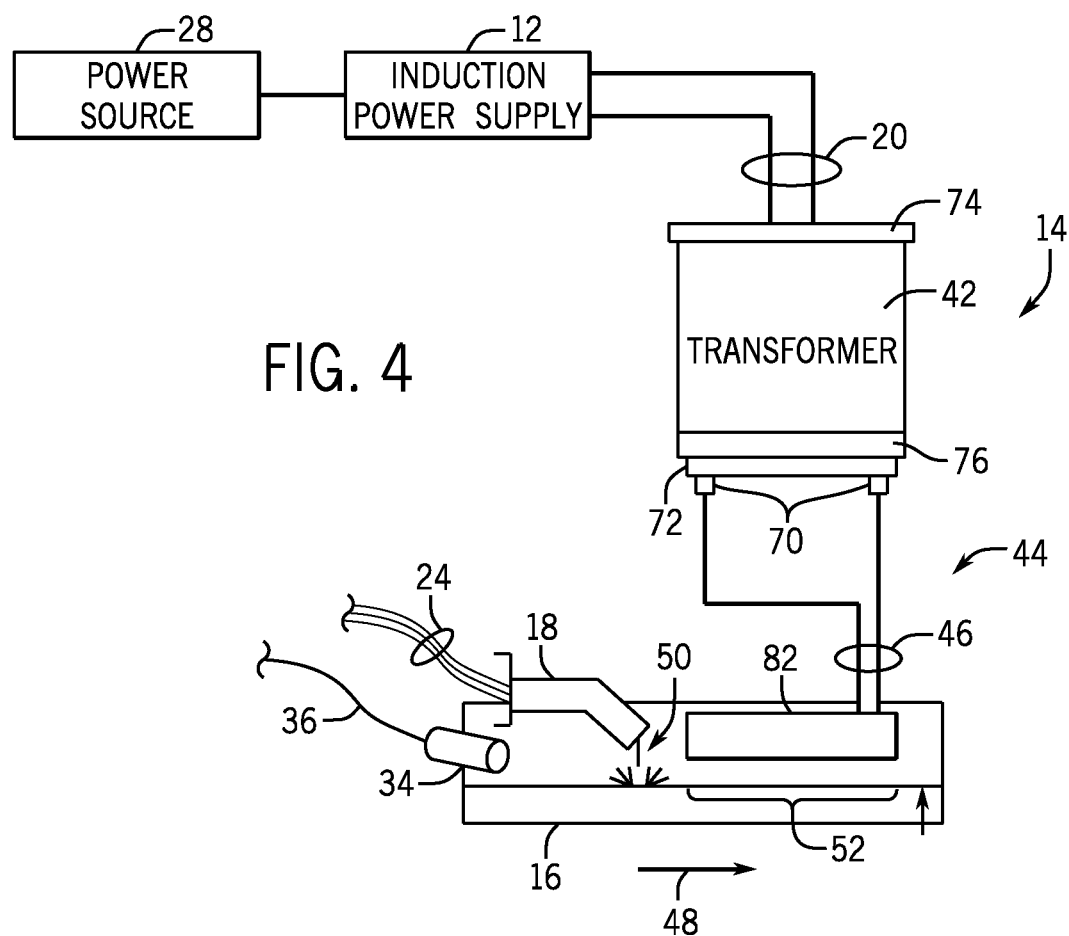
FIG. 4 is a schematic of an embodiment of an induction heating assembly positioned ahead of a welding arc produced by a welding torch in accordance with the present disclosure.

FIG. 4 is a schematic of an embodiment of the induction heating assembly 14 positioned ahead of the welding arc 50 produced by the welding torch 18 in accordance with the present disclosure. As discussed above, the transformer 42 is coupled to the induction power supply 12 via the cable bundle 20. The induction power supply 12 supplies an alternating current to the transformer 42 through the cable bundle 20. For example, the alternating current may have a frequency from 5,000 Hz to 300,000 Hz, although other frequencies may be supplied as well. From the transformer 42, the alternating current is supplied to the secondary induction heating coil 44. Specifically, the alternating current exits the transformer 42 through power connections 70 attached to a base 72 of the transformer 42. In certain embodiments, the electrical conductors 46 are coupled to the power connections 70, e.g., by soldering, brazing, or bolting. However, in other embodiments described herein, the electrical conductors 46 may be removably coupleable with the power connections 70 to enable different secondary induction heating coils 44 to be interchangeably coupled to the transformer 42. As mentioned above, the electrical conductors 46 may have a hollow core, thereby enabling a coolant to flow through the electrical conductors 46 of the secondary induction heating coil 44 to regulate a maximum temperature of the secondary induction heating coil 44. In other words, the electrical conductors 46 of the secondary induction heating coil 44 may carry the alternating current and a coolant flow. As shown, in certain embodiments, the transformer 42 may be supported by a top plate 74 and a bottom plate 76. In certain embodiments, the top and bottom plates 74, 76 may be formed from a ceramic or other electrically insulating material.

Figure 5:
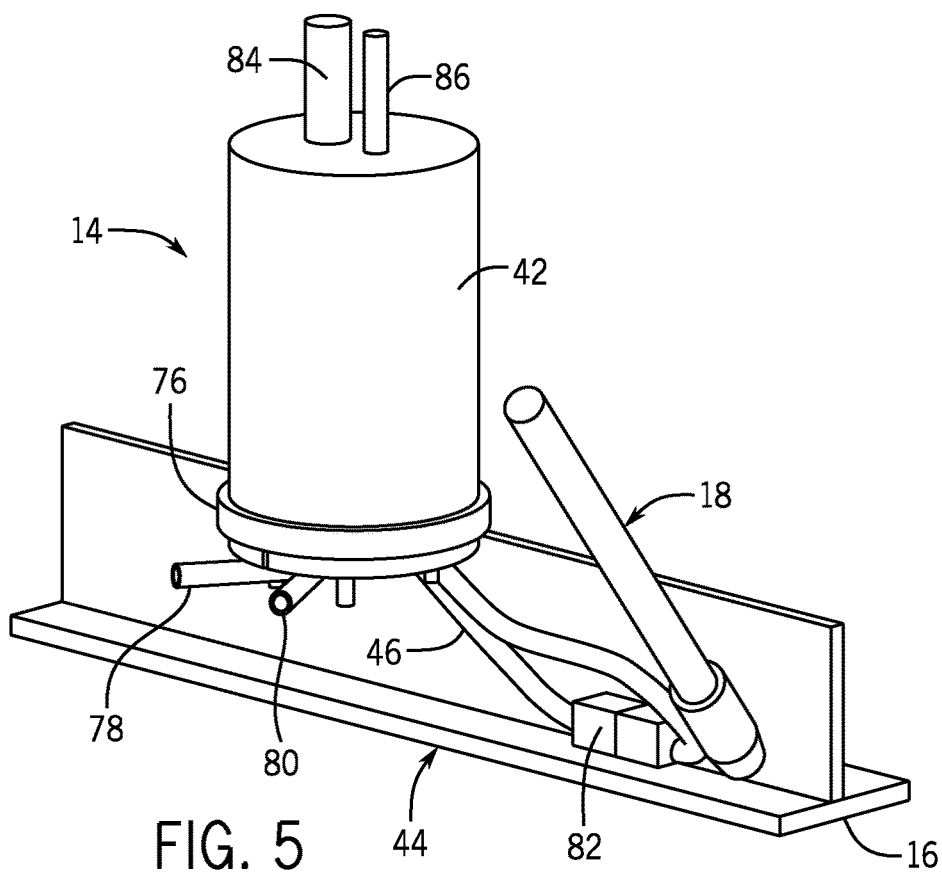
FIG. 5 is a perspective view of an embodiment of the induction heating assembly in accordance with the present disclosure.

FIG. 5 is a perspective view of an embodiment of the induction heating assembly 14 in accordance with the present disclosure. The electrical conductors 46 couple to posts of the transformer 42 to circulate the alternating current from the transformer through the electrical conductors 46. Furthermore, the electrical conductors 46 may be hollow such that coolant flow may be received through a coolant inlet 78, circulate through the hollow interior of the electrical conductors 46, and exit via a coolant outlet 80. In certain embodiments, the secondary induction heating coil 44 is coupled to a secondary induction heating coil flux concentrator 82. For example, in certain embodiments, the secondary induction heating coil flux concentrator 82 may be a box or other hollow structure formed from a highly permeable material, such as ferrite, machined ferrite, and so forth. Additionally, in certain embodiments, the secondary induction heating coil flux concentrator 82 may be coated with a heat sink compound configured to transfer heat to the cooled elements of the secondary induction heating coil 44.

As described in greater detail herein, the transformer 42 and the secondary induction heating coil 44 may be removably coupleable with each other in certain embodiments, thereby enabling the secondary induction heating coil 44 to be interchanged with respect to the transformer 42 during operation of the system 10. For example, in certain embodiments, a robotic positioning system may manipulate the positioning of the induction heating assembly 14 and the coupling between the transformer 42 and the secondary induction heating coil 44 to, for example, move the induction heating assembly 14 to an induction heating coil changing station to detach a first secondary induction heating coil 44 from the transformer 42, and attach a second secondary induction heating coil 44 to the transformer 42, thereby facilitating different secondary induction heating coils 44 to be used induction heating of different types of welds, for example. In addition, in certain embodiments, the secondary induction heating coil flux concentrator 82 may similarly be removably coupleable with the secondary induction heating coil 44 to facilitate interchangeability of the secondary induction heating coil flux concentrators 82. For example, the different secondary induction heating coil flux concentrators 82 may include different highly permeable materials in certain embodiments. As used herein, the term "highly permeable" may be used to refer to any material having a permeability substantially greater than air (e.g., permeability of greater than 10, greater than 100, and so forth).

Figure 6:
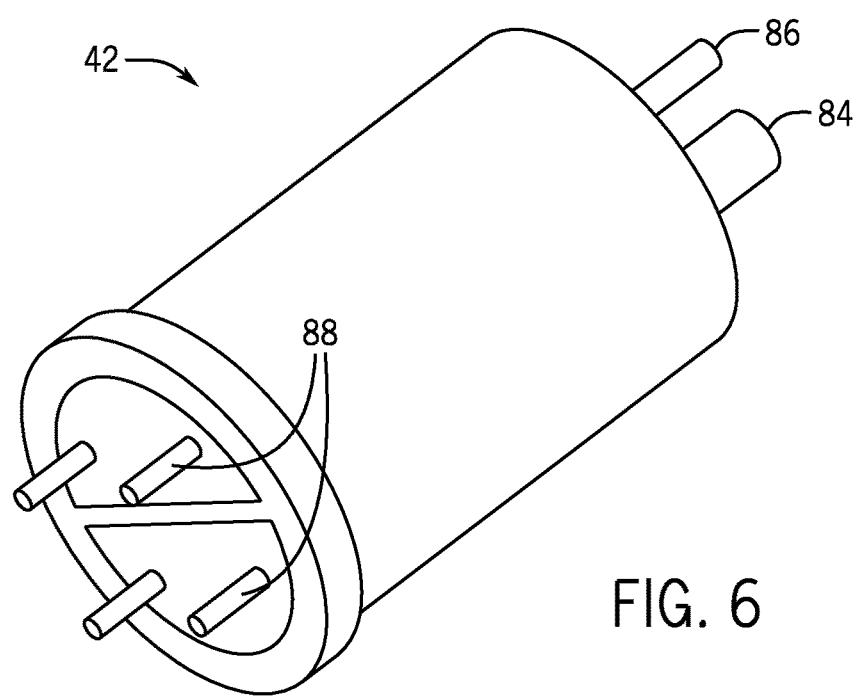
FIG. 6 is a perspective view of an embodiment of a transformer in accordance with the present disclosure.

FIG. 6 is a perspective view of an embodiment of the transformer 42 in accordance with the present disclosure. As illustrated, in certain embodiments, the transformer 42 includes an inlet conduit 84 that functions as both a primary lead entrance/exit (e.g., for conveying AC power for the induction heating) and a coolant inlet, and an outlet conduit 86 that functions as a coolant outlet. The coolant that enters and exits through the coolant inlet and outlet of the transformer 42 is used to cool the internal components of the transformer 42. In addition, as illustrated in FIG. 6, in certain embodiments the transformer 42 includes a plurality of secondary terminals 88 (e.g., with threaded studs) that may be used to couple the transformer 42 to the electrical conductors 46 of the secondary induction heating coil 44 to convey the induction heating power through the secondary induction heating coil 44 (e.g., to the secondary induction heating coil flux concentrator 82).

Figure 7:
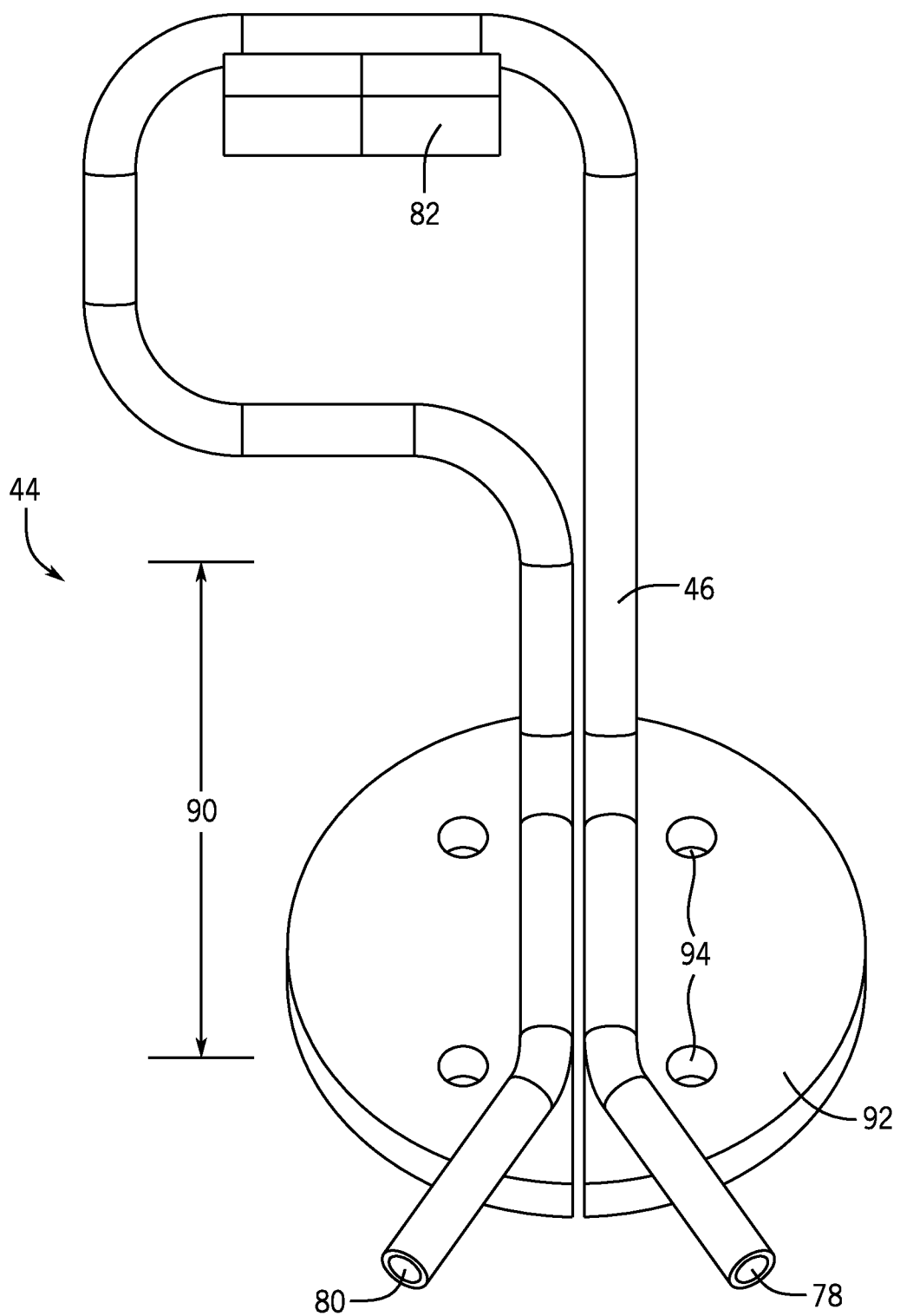
FIG. 7 is a perspective view of an embodiment of an secondary induction heating coil in accordance with the present disclosure.

FIG. 7 is a perspective view of an embodiment of the secondary induction heating coil 44 in accordance with the present disclosure. As illustrated, in general, it may be particularly advantageous to minimize the distance between two generally parallel sections 90 of the electrical conductors 46 of the secondary induction heating coil 44, and to maximize the length of these sections 90 to minimize the inductance of the secondary induction heating coil 44. In addition, it may be advantageous to position the transformer 42 as close as possible to the workpiece 16 to minimize the required length of the secondary induction heating coil 44. In addition, in certain embodiments, the secondary induction heating coil 44 may include a secondary plate 92 configured to mate with the bottom plate 76 of the transformer 42. For example, in certain embodiments, the secondary plate 92 includes a plurality of openings 94 through which the plurality of secondary terminals 88 of the transformer 42 may fit, thereby establishing an electrical connection between the bottom plate 76 of the transformer 42 and the secondary plate 92 of the secondary induction heating coil 44.

In certain embodiments, the secondary plate 92 of the secondary induction heating coil 44 and the bottom plate 76 of the transformer 42 include quick disconnect features 96 to enable the transformer 42 and the secondary induction heating coil 44 to be quickly connected and disconnected from each other such that the electrical and coolant connections (e.g., facilitating induction heating power and coolant to be transferred) between the transformer 42 and the secondary induction heating coil 44 may be quickly established and removed. In such embodiments, a valve may be used in the quick disconnect features 96 of the transformer 42 to ensure that the coolant flow is rerouted during the connection process. Such quick disconnect features 96 may be particularly advantageous in systems that utilize robotic positioning systems (e.g., which robotically manipulate positioning of the secondary induction heating coil 44 and/or the transformer 42 of the induction heating assembly 14).

FIGS. 8A and 8B are side views of embodiments of the induction heating assembly 14, illustrating the quick disconnect features 96 for groove welds and fillet welds, respectively, in accordance with the present disclosure. The quick disconnect features 96 facilitate relatively quick coupling and decoupling of the secondary induction heating coil 44 from the transformer 42 while creating and terminating, respectively, connections for coolant and power between the transformer 42 and the secondary induction heating coil 44 during coupling and decoupling of the secondary induction heating coil 44 from the transformer 42. The quick coupling and decoupling may be performed without the use of tools, and may be accomplished in a matter of seconds (e.g., less than 5 seconds, less than 2 seconds, less than 1 second, or even faster), as opposed to more conventional coupling mechanisms, which may take substantially longer amounts of time.

Figure 9:
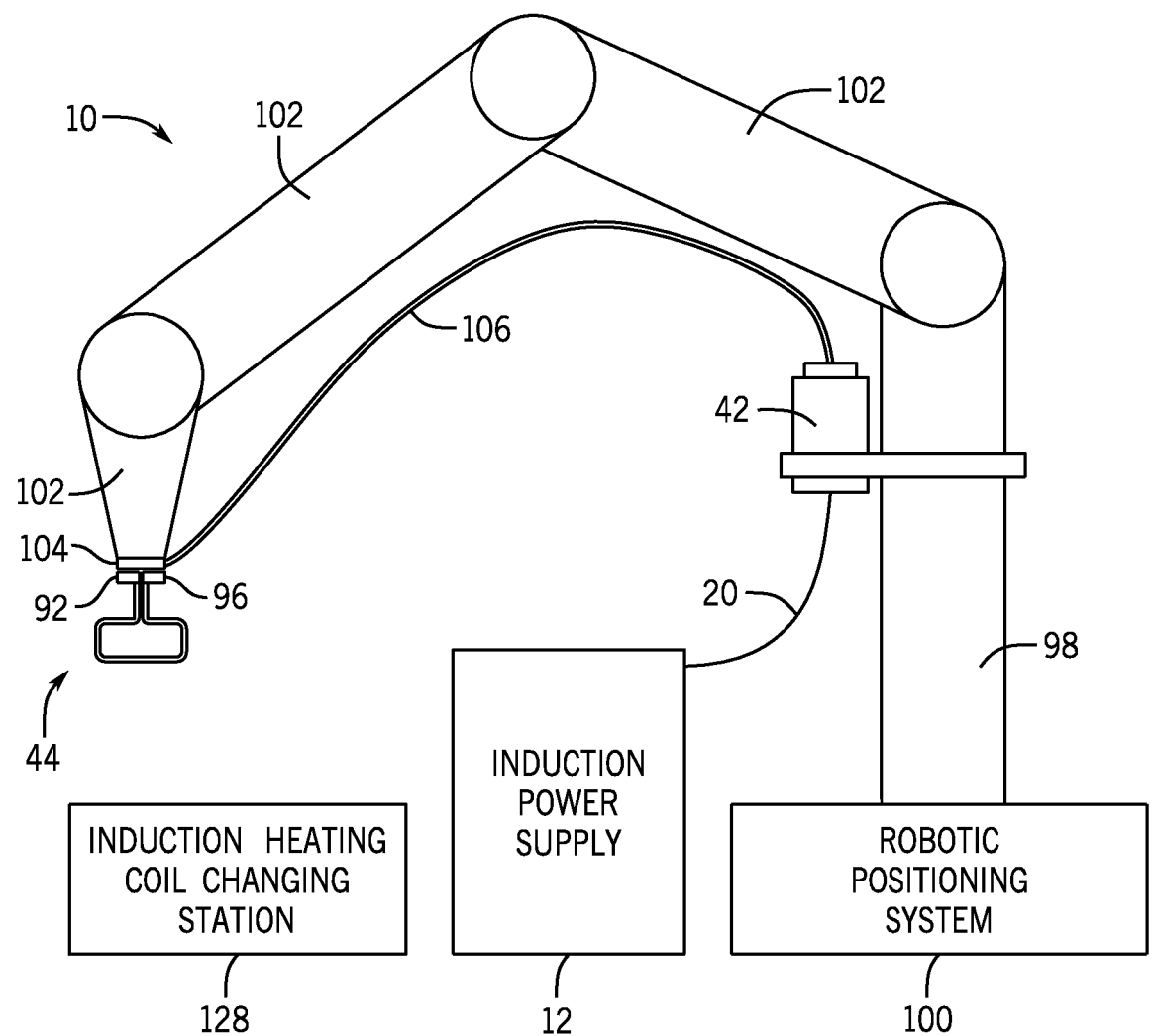
FIG. 9 is a side view of an embodiments of the induction heating system, illustrating the transformer and the secondary induction heating coil as separate components that are independently positionable with respect to each other, in accordance with the present disclosure.
Figure 10:
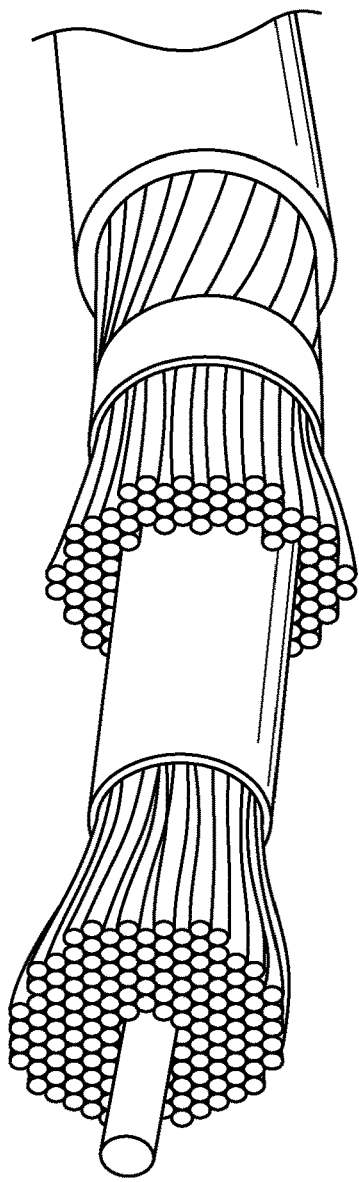
FIG. 10 is a perspective view of an embodiment of a litz cable that may be used to connect the transformer with a remotely located secondary induction heating coil in accordance with the present disclosure.

FIGS. 5-8 generally illustrate embodiments where the transformer 42 and the secondary induction heating coil 44 are directly coupled with each other. In other embodiments, the transformer 42 and the secondary induction heating coil 44 may not be directly coupled to each other, but rather positionable remotely from each other. FIG. 9 is a side view of an embodiment of the induction heating system 10, illustrating the transformer 42 and the secondary induction heating coil 44 as separate components that are independently positionable with respect to each other, in accordance with the present disclosure. As illustrated, in certain embodiments, the transformer 42 may be directly mounted to a base structure 98 of a robotic positioning system 100 and, as such, may remain in a relatively fixed position during operation of the system 10. In contrast, the secondary induction heating coil 44 is directly coupled to a remote arm 102 of the robotic positioning system 100, wherein the positioning of the arms 102 is manipulated by the robotic positioning system 100 such that the secondary induction heating coil 44 may be moved relative to the workpiece 16 during operation of the system 10. In certain embodiments, quick disconnect features 96 may be used to connect/disconnect the secondary induction heating coil 44 with the remote arm 102. For example, an arm plate 104 (e.g., similar to the bottom plate 76 of the transformer 42 embodiment illustrated in FIGS. 8A and 8B, for example) may be configured to mate with the secondary plate 92 of the secondary induction heating coil 44 to establish/remove electrical and/or coolant connections between the transformer 42 and the remotely located secondary induction heating coil 44. To that end, in certain embodiments, the arm plate 104 may be connected to the transformer 42 via a cable 106 (e.g., a cable bundle) configured to convey the induction heating power and/or coolant between the transformer 42 and the arm plate 104. For example, in certain embodiments, the cable 106 may include a flexible low inductance secondary connection such as a coaxial liquid cooled litz cable, as illustrated in FIG. 10.

In other embodiments, as illustrated in FIGS. 11A and 11B, the secondary induction heating coil 44 may be remotely located from the transformer 42 via a secondary connector 108 that includes two generally parallel plates 110, 112, for example, a top plate 110 and a bottom plate 112 connected by two thin, generally parallel sheets 114 that connect the top and bottom plates 110, 112 to each other. In certain embodiments, the two sheets 114 may be comprised of copper. In general, a first sheet 114 functions to convey induction heating power to the secondary induction heating coil 44 whereas the second sheet 114 completes the electrical circuit between the top and bottom plates 110, 112. As such, the two sheets 114 form a low inductance bus structure to transmit high frequency AC power from the transformer 42 to a secondary induction heating coil 44 via the top and bottom plates 110, 112. As illustrated, in certain embodiments, the two sheets 114 may extend between the top and bottom plates 110, 112 generally perpendicular to the top and bottom plates 110, 112. In certain embodiments, the two sheets 114 are separated by a thin insulating layer 116 to electrically isolate the two sheets 114 from each other and minimize the inductance of the secondary connector 108.

It will be appreciated that the top plate 110 of the secondary connector 108 may be configured to directly couple with the bottom plate 76 of the transformer 42, and the bottom plate 112 of the secondary connector 108 may be configured to directly couple with the secondary plate 92 of the secondary induction heating coil 44 in similar manner as the bottom plate 76 of the transformer 42 and the secondary plate 92 of the secondary induction heating coil 44 may directly couple with each other as described herein. For example, in certain embodiments, the top and bottom plates 110, 112 of the secondary connector 108 may include quick disconnect features 96 as described herein.

Figure 12:
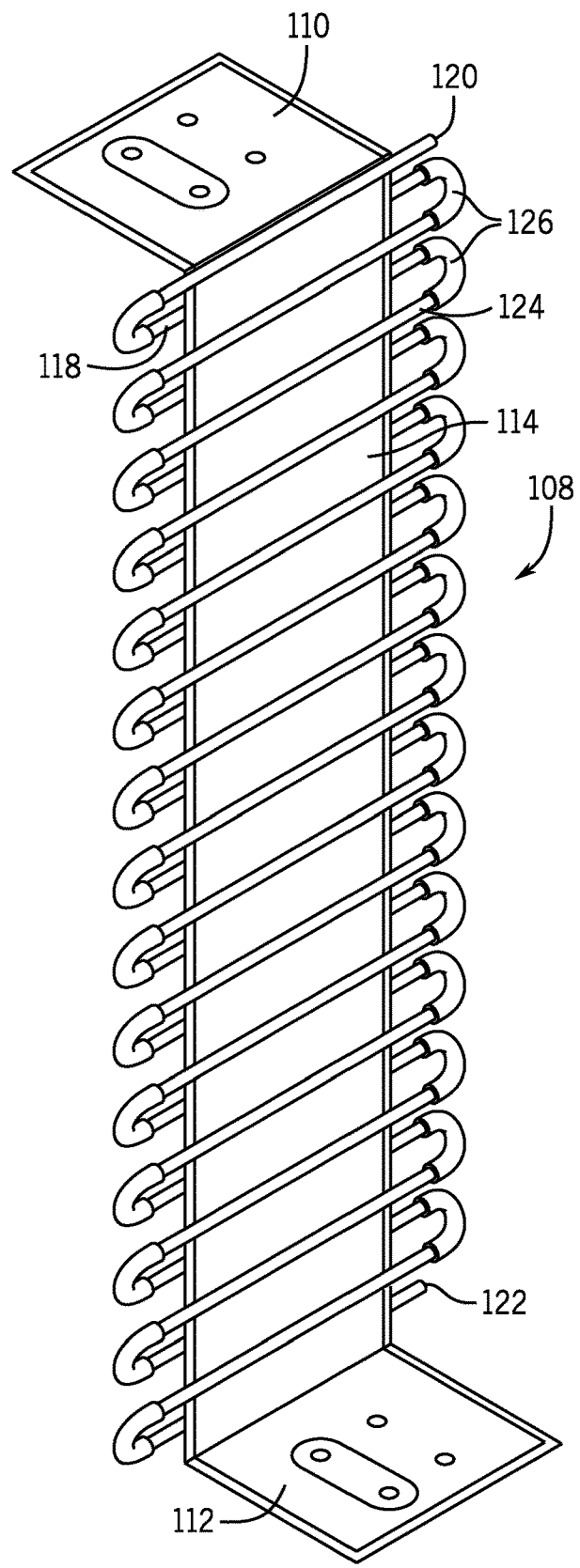
FIG. 12 is a perspective view of an embodiment of the secondary connector in accordance with the present disclosure.

In addition, in certain embodiments, the secondary connector 108 may include cooling tubes 118 disposed on each side of the two sheets 114 to enable the coolant from the transformer 42 to be circulated through the secondary induction heating coil 44. In certain embodiments, a first cooling tube 118 disposed on a first side of the sheets 114 may deliver the coolant from the transformer 42 to the secondary induction heating coil 44, and a second cooling tube 118 disposed on a second, opposite side of the sheets 114 may return the coolant from the secondary induction heating coil 44 to the transformer 42. FIG. 12 is a perspective view of an embodiment of the secondary connector 108 in accordance with the present disclosure. It will be appreciated that a cooling tube 118 is only illustrated on a first side of the sheets 114 for illustrative purposes. As illustrated, a first cooling tube 118 includes a coolant inlet 120 configured to connect with the transformer 42 to receive coolant from the transformer 42 and a coolant outlet 122 to connect with the secondary induction heating coil 44 such that the coolant may be delivered from the transformer 42 to the secondary induction heating coil 44. It will be appreciated that the second cooling tube 118 (not shown) may include similar inlets and outlets for facilitating the return flow of coolant from the secondary induction heating coil 44 to the transformer 42. As illustrated, in certain embodiments, the cooling tubes 118 may include a plurality of generally parallel tube sections 124 that alternate back and forth on their respective sides of the sheets 114 to facilitate cooling of the sheets 114 as well. In certain embodiments, proximate tube sections 124 may be connected by flexible (e.g., rubber) hoses 126 that allow for flexibility during usage.

As described above, in certain embodiments, the transformer 42 and the secondary induction heating coil 44 may be removably coupleable with each other, thereby enabling the secondary induction heating coil 44 to be interchanged with respect to the transformer 42 during operation of the system 10. Similarly, in certain embodiments, the secondary induction heating coil flux concentrator 82 may be removably coupleable with the secondary induction heating coil 44 to facilitate interchangeability of the secondary induction heating coil flux concentrators 82. As such, returning now to FIG. 9, in certain embodiments, the robotic positioning system 100 may be configured to move the secondary induction heating coil 44 to an induction heating coil changing station 128 to, for example, detach the secondary induction heating coil 44 from the remote arm 102, and attach another secondary induction heating coil 44 to the remote arm 102, thereby facilitating different secondary induction heating coils 44 to be used for induction heating of different types of welds, for example. In addition, in certain embodiments, the robotic positioning system 100 may be configured to move the secondary induction heating coil 44 to the induction heating coil changing station 128 to, for example, detach the secondary induction heating coil flux concentrator 82 from the secondary induction heating coil 44, and attach another secondary induction heating coil flux concentrator 82 to the secondary induction heating coil 44.

Figure 13:
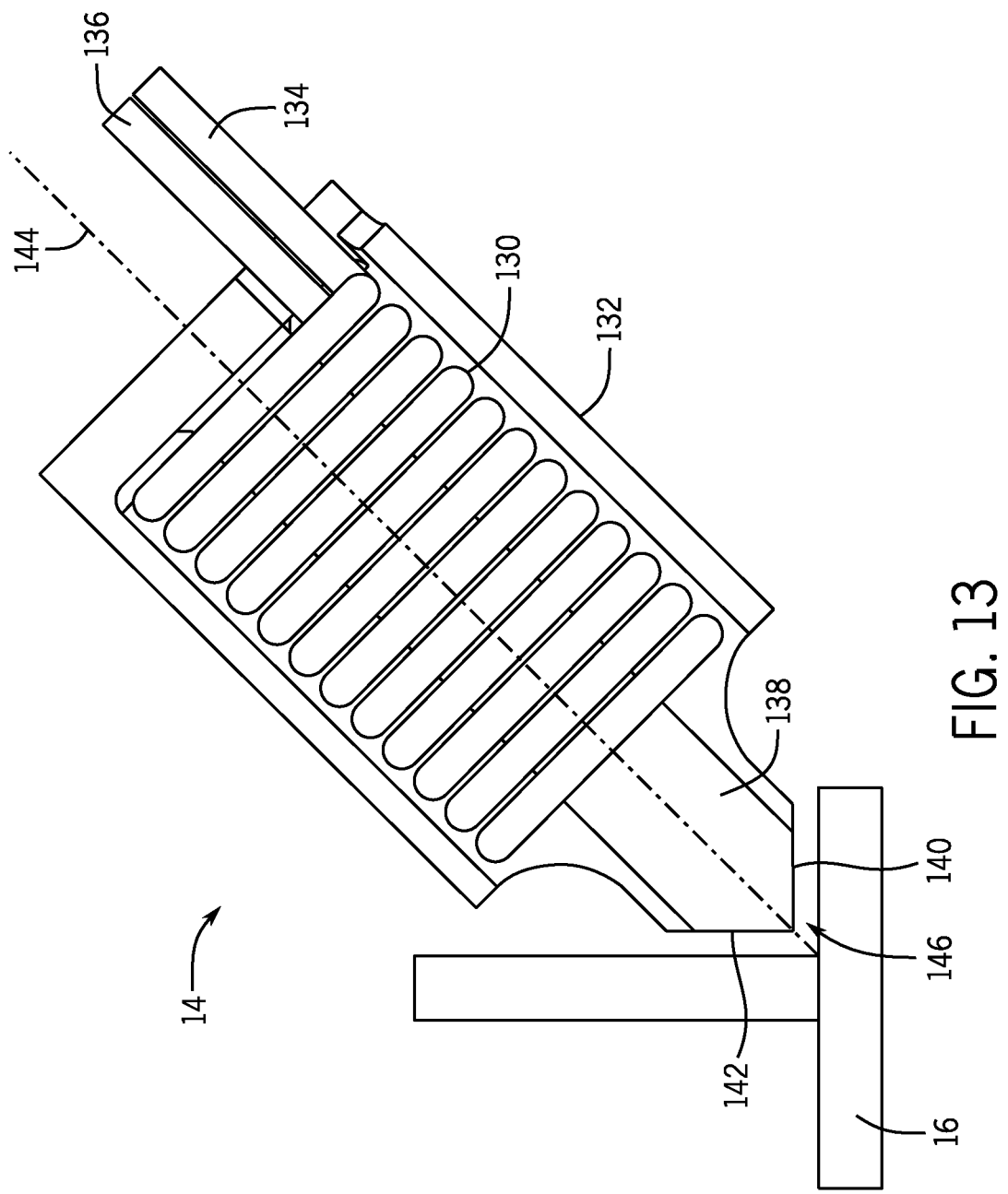
FIGS. 13-16 illustrate various embodiments of integrated induction heating assemblies for various different types of welds in accordance with the present disclosure.
Figure 14:
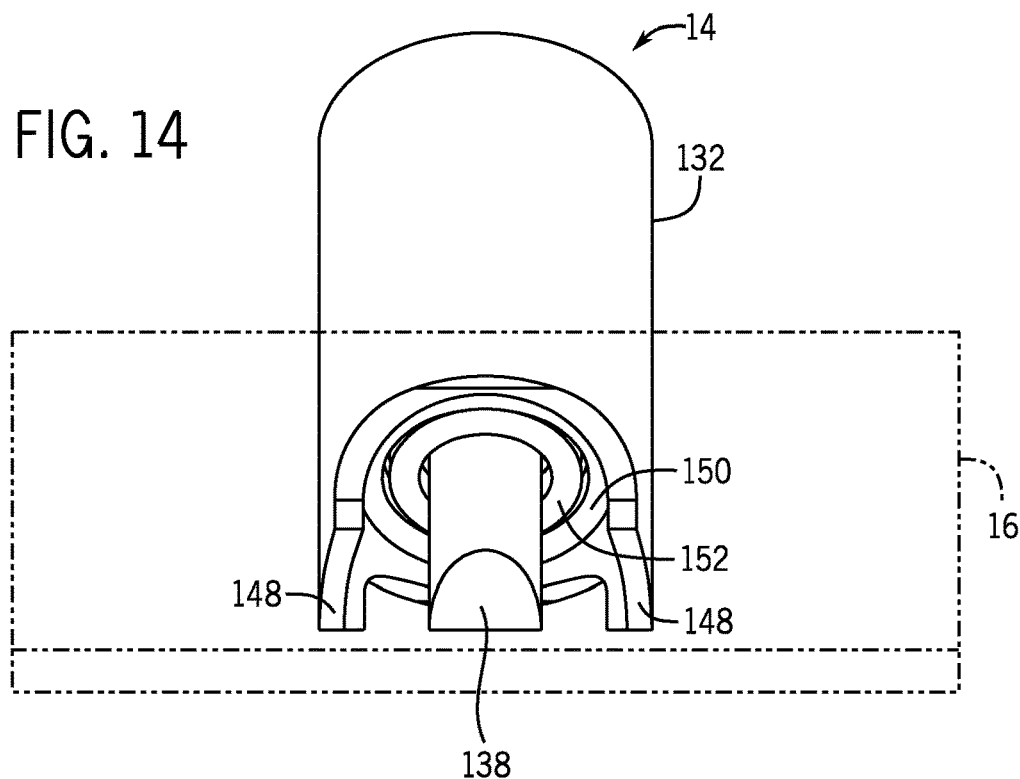
Figure 15:
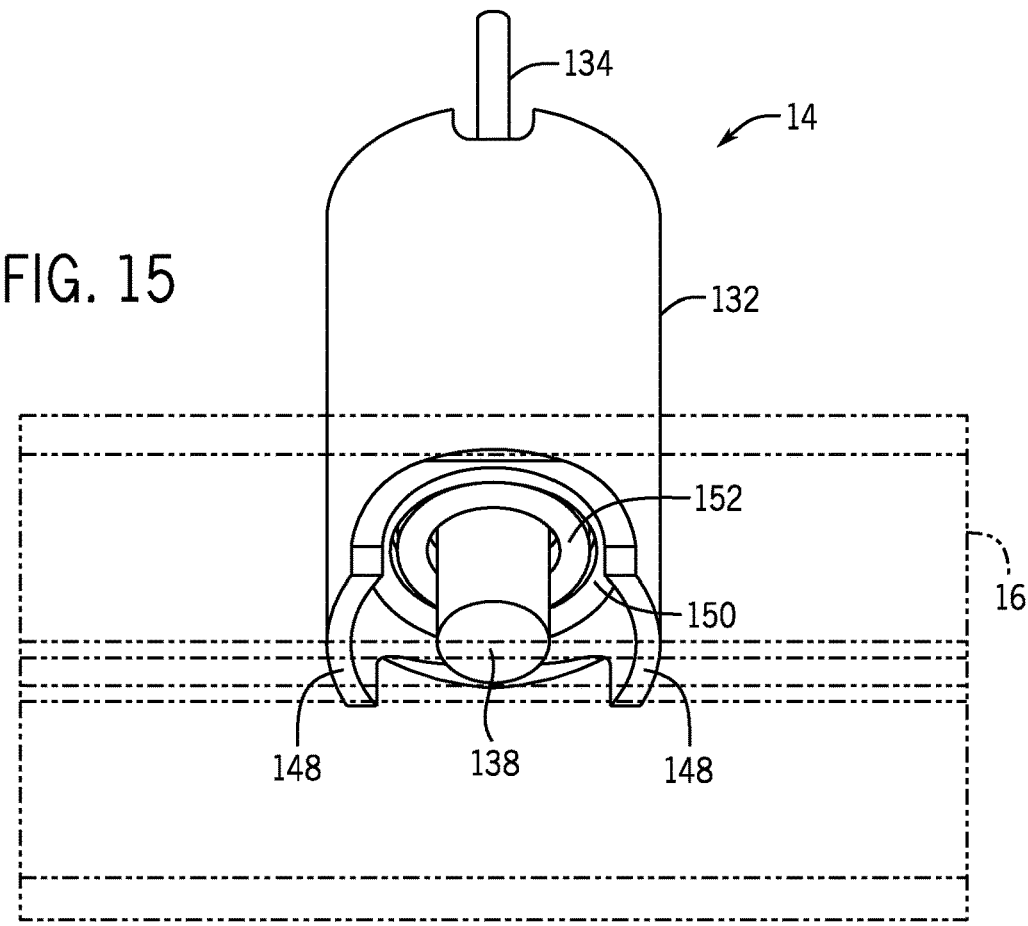
Figure 16:
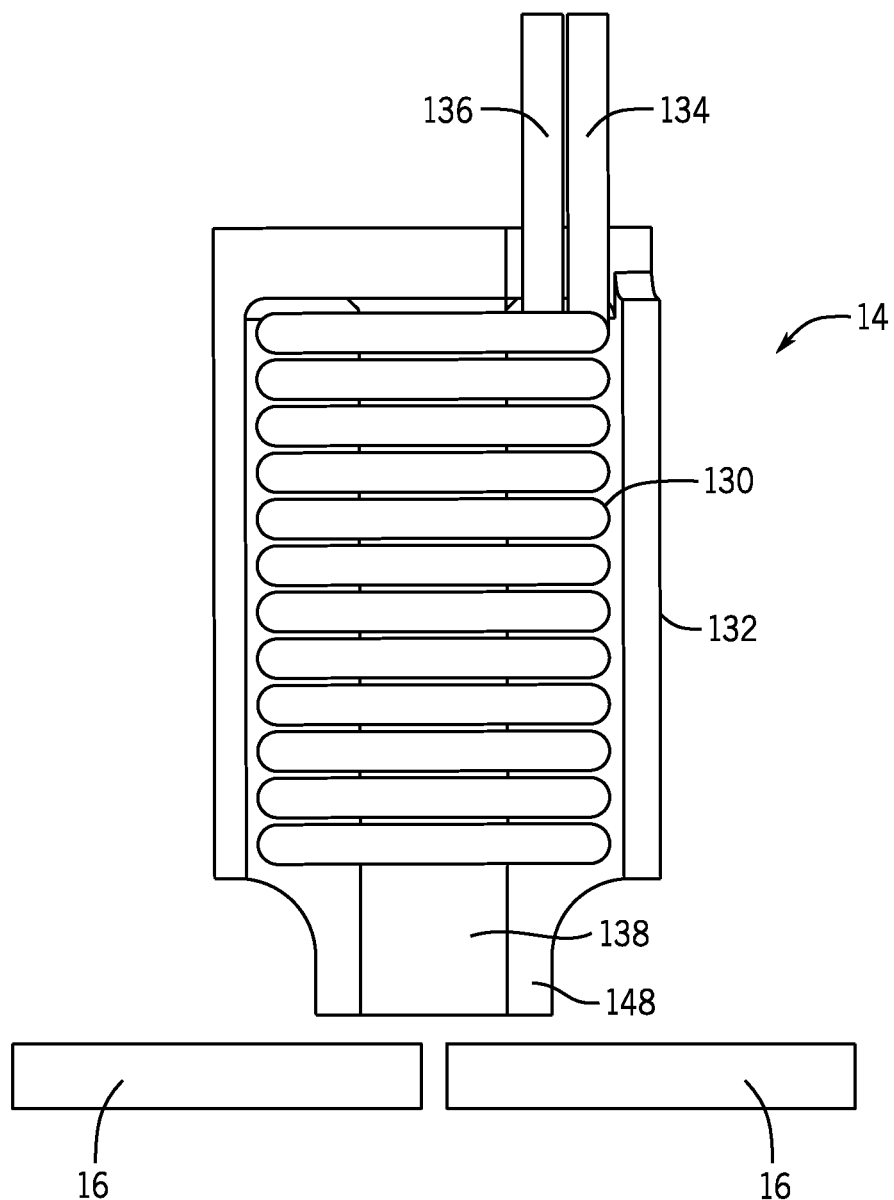

In certain embodiments, the transformer 42 and the secondary induction heating coil 44 described herein may be combined into integrated induction heating assemblies 14 that may, for example, be interchangeable at the induction heating coil changing station 128. FIGS. 13-16 illustrate various embodiments of integrated induction heating assemblies 14 for various different types of welds in accordance with the present disclosure. For example, FIGS. 13 and 14 illustrate embodiments of an integrated induction heating assembly 14 specifically configured for fillet welding, and FIGS. 15 and 16 illustrate embodiments of an integrated induction heating assembly 14 specifically configured for groove welding. Each of the embodiments include a hollow electrical conduit 130 that wraps around an interior of a housing 132 of the integrated induction heating assembly 14, and which includes an inlet 134 and an outlet 136 for circulating induction heating power and coolant through the integrated induction heating assembly 14. It will be appreciated that the inlet and outlet 134, 136 are configured with quick disconnect features 96 in certain embodiments to enable interchangeability via the induction heating coil changing station 128 (see FIG. 9).

The induction heating power conveyed through the electrical conduit 130 is delivered to a highly permeable magnetic core 138 (e.g., induction heating flux concentrator) specifically designed to focus flux to a particular type of weld. For example, as illustrated in FIGS. 13 and 14, the integrated induction heating assembly 14 specifically design for fillet welding includes a magnetic core 138 that has two adjacent sides 140, 142 that are generally aligned perpendicular with each other, and each of the adjacent sides 140, 142 are generally aligned at a 45° angle with respect to a central axis 144 of the integrated induction heating assembly 14. As such, the distal end 146 of the magnetic core 138 is configured to approximately match the 90° angle formed by the workpiece 16 on which the fillet weld is created. As illustrated in FIG. 14, the housing 132 of the integrated induction heating assembly 14 includes opposite side walls 148 that extend from the housing 132 and are generally shaped similarly to the magnetic core 138 to also match the 90° angle formed by a fillet weld joint. As also illustrated in FIG. 14, the electrical conduit 130 disposed within the housing 132 of the integrated induction heating assembly 14 includes a first plurality of windings (e.g., turns) 150 that introduces the induction heating power and coolant into the integrated induction heating assembly 14, and a second plurality of windings (e.g., turns) 152 that complete the electrical circuit and return the coolant from the integrated induction heating assembly 14. In contrast, the integrated induction heating assembly 14 illustrated in FIGS. 15 and 16 are more suited for groove welding insofar as the magnetic core 138 forms a generally cylindrical shape and the opposite side walls 148 are generally rectangular to more closely match the shape of a particular groove weld joint. In general, the distal end of the magnetic core 138 illustrated in FIGS. 15 and 16 includes a substantially flat surface configured to be disposed substantially parallel to the workpieces 16 forming the groove weld joint therebetween.

As used herein, the term "substantially" (e.g., "substantially parallel", "substantially perpendicular", and so forth) is intended to account for variations due to manufacturing tolerance, operating conditions (e.g., vibrations, thermal expansion, etc.), and so forth. For example, one of ordinary skill in the art will appreciate that words such as "parallel", "perpendicular" have precise mathematical and/or geometric meanings. However, the terms "substantially parallel" and "substantially perpendicular allow for variations due to manufacturing tolerance, operating conditions (e.g., vibrations, thermal expansion, etc.), and so forth, while maintaining the spirit of the claimed term.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An induction heating system comprising:
   an induction heating power supply configured to generate induction heating power; and
   an induction heating assembly configured to convert the induction heating power received from the induction heating power supply unit to an alternating current (AC) heating current, wherein the induction heating assembly comprises:
      a magnetic core disposed at a distal end of the induction heating assembly,
      wherein a shape of the magnetic core corresponds to a shape of the workpiece;
      a conductor configured to induce an AC magnetic field in the magnetic core by conducting the AC heating current, a portion of the magnetic core extending beyond the conductor and disposed proximate to a workpiece, the portion of the magnetic core configured to concentrate the AC magnetic field in the workpiece to induce eddy currents into a workpiece, wherein the induction heating assembly is interchangeably coupled to the induction heating power supply to receive the induction heating power from the induction heating power supply; and
      a housing to house the conductor, the housing comprising a plurality of opposing side walls that extend from the housing and are shaped to partially surround the portion of the magnetic core extending beyond the conductor.

2. The induction heating system of claim 1, wherein the magnetic core comprises a highly permeable magnetic core configured to focus the magnetic field with respect to the workpiece, wherein a type of the highly permeable magnetic core corresponds to a type of the workpiece.

3. An induction heating system, comprising:
   an induction heating power supply configured to generate induction heating power; and
   an induction heating assembly configured to convert the induction heating power received from the induction heating power supply unit to an alternating current (AC) heating current, wherein the induction heating assembly comprises:
      a magnetic core disposed at a distal end of the induction heating assembly, wherein a shape of the magnetic core corresponds to a shape of the workpiece; and
      a conductor configured to induce an AC magnetic field in the magnetic core by conducting the AC heating current, a portion of the magnetic core extending beyond the conductor comprises adjacent perpendicular sides at a distal end of the magnetic core and disposed proximate adjacent members of a fillet weld workpiece while the magnetic field induces the eddy currents into the workpiece, the portion of the magnetic core configured to concentrate the AC magnetic field in the workpiece to induce eddy currents into a workpiece, wherein the induction heating assembly is interchangeably coupled to the induction heating power supply to receive the induction heating power from the induction heating power supply.

4. The induction heating system of claim 1, wherein a distal end of the magnetic core comprises a substantially flat surface configured to be disposed substantially parallel to a groove weld workpiece.

5. The induction heating system of claim 1, comprising a robotic positioning system configured to manipulate positioning of the induction heating assembly with respect to the workpiece.

6. The induction heating system of claim 5, comprising an induction heating assembly changing system, wherein the robotic positioning system is configured to move the induction heating assembly to the induction heating assembly changing station to decouple the induction heating assembly from the induction heating power supply unit and to couple another induction heating assembly to the induction heating power supply unit.

7. The induction heating system of claim 1, wherein the induction heating assembly is an interchangeable induction heating assembly configured to electrically couple to and decouple from the induction heating power supply unit.

8. The induction heating system of claim 7, wherein the interchangeable induction heating assembly comprises a quick disconnect feature configured to facilitate quick coupling and decoupling of the interchangeable induction heating assembly with the induction heating power supply unit.

9. The induction heating system of claim 1, wherein the induction heating assembly comprises a hollow electrical conductor tube configured to flow a coolant.

10. An induction heating system comprising:
a transformer configured to receive alternating current (AC) power from an induction heating power supply unit, and to transform the AC power into induction heating power;
a first interchangeable induction heating coil comprising a flux concentrator surrounding a portion of the first interchangeable heating coil and disposed proximate to the workpiece, the first interchangeable induction heating coil configured to electrically couple to and decouple from the transformer, to receive the induction heating power from the transformer, and to produce an AC magnetic field that induces eddy currents into a first workpiece, wherein a shape of the first interchangeable induction heating coil corresponds to a shape of the first workpiece; and
a second interchangeable induction heating coil configured to electrically couple to and decouple from the transformer, to receive the induction heating power from the transformer, and to produce an AC magnetic field that induces eddy currents into a second workpiece, wherein a shape of the second interchangeable induction heating coil corresponds to a shape of the second workpiece, the shape of the second interchangeable induction heating coil is different than the shape of the first interchangeable induction heating coil, and the shape of the second workpiece is different than the shape of the first workpiece.

11. The induction heating system of claim 10, wherein the flux concentrator comprises a highly permeable material configured to focus the AC magnetic field with respect to the workpiece, wherein a type of the highly permeable material corresponds to a type of the workpiece.

12. The induction heating system of claim 10, wherein the first interchangeable induction heating coil comprises a quick disconnect feature configured to facilitate quick coupling and decoupling of the first interchangeable induction heating coil with the transformer without the use of tools.

13. The induction heating system of claim 12, wherein the first interchangeable induction heating coil comprises an electrical conductor loop that extends substantially orthogonally from the quick disconnect feature.

14. The induction heating system of claim 12, wherein the first interchangeable induction heating coil comprises an electrical conductor loop that extends from the quick disconnect feature at an angle.

15. The induction heating system of claim 14, wherein the electrical conductor loop comprises a hollow tube configured to flow a coolant.

16. The induction heating system of claim 10, comprising a robotic positioning system configured to manipulate positioning of the first interchangeable induction heating coil with respect to the workpiece.

17. The induction heating system of claim 16, comprising an induction heating coil changing system, wherein the robotic positioning system is configured to move the interchangeable induction heating coil to the induction heating coil changing station to electrically decouple the interchangeable induction heating coil from the transformer and to electrically couple the second interchangeable induction heating coil to the transformer.

18. The induction heating system of claim 10, comprising a cable configured to electrically couple the transformer to the first interchangeable induction heating coil.

19. The induction heating system of claim 10, comprising a bus structure configured to physically couple the transformer to the first interchangeable induction heating coil.

20. The induction heating system of claim 19, wherein the bus structure comprises a first plate configured to physically couple the bus structure to the transformer, a second plate configured to physically couple the bus structure to the first interchangeable induction heating coil, and first and second substantially parallel sheets that connect the first and second plates.

21. The induction heating system of claim 20, wherein the first and second plates are substantially parallel, and the first and second sheets extend perpendicular from the first and second plates.

22. The induction heating system of claim 20, wherein the first and second sheets are separated by a layer of insulation.

23. The induction heating system of claim 20, comprising a first electrical conductor tube disposed adjacent the first sheet, and a second electrical conductor tube disposed adjacent the second sheet, wherein the first electrical conductor tube is configured to deliver a coolant to the first interchangeable induction heating coil, and the second electrical conductor tube is configured to return the coolant from the first interchangeable induction heating coil.

* * * * *